(12) United States Patent
Horiguchi et al.

(10) Patent No.: US 6,412,689 B1
(45) Date of Patent: Jul. 2, 2002

(54) COMMUNICATION EQUIPMENT AND METHOD FOR BUSINESS CARD INFORMATION INTERCHANGE

(75) Inventors: Takeo Horiguchi; Yosuke Tajika; Kazuaki Iwamura, all of Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/556,689

(22) Filed: Apr. 21, 2000

(30) Foreign Application Priority Data

Apr. 22, 1999 (JP) .......................................... 11-114751

(51) Int. Cl.[7] .............................................. G06F 17/00
(52) U.S. Cl. ........................... 235/375; 235/380; 707/7; 707/9
(58) Field of Search ................................ 235/375, 380; 707/7, 9; 705/6, 7, 26, 27

(56) References Cited

U.S. PATENT DOCUMENTS

| | | | |
|---|---|---|---|
| 5,493,105 A | * 2/1996 | Desai | 235/375 |
| 5,533,110 A | * 7/1996 | Pinard et al. | 379/201 |
| 5,544,358 A | * 8/1996 | Capps et al. | 395/600 |
| 5,640,565 A | * 6/1997 | Dickinson | 395/683 |
| 5,706,517 A | * 1/1998 | Dickinson | 395/683 |
| 5,818,442 A | * 10/1998 | Adamson | 345/330 |
| 5,826,263 A | * 10/1998 | Nakabayashi et al. | 707/7 |
| 5,848,412 A | * 12/1998 | Rowland et al. | 707/9 |
| 5,929,771 A | * 7/1999 | Gaskill | 340/825.44 |
| 6,084,951 A | * 7/2000 | Smith et al. | 379/93.17 |
| 6,138,908 A | * 10/2000 | Moon et al. | 235/375 |
| 6,157,954 A | * 12/2000 | Moon et al. | 379/219 |
| 6,205,478 B1 | * 3/2001 | Sugano et al. | 709/223 |
| 6,226,367 B1 | * 5/2001 | Smith et al. | 379/142.04 |

FOREIGN PATENT DOCUMENTS

| | | | |
|---|---|---|---|
| DE | 297 20 211 U1 | 4/1998 | |
| EP | JP 06028372 | 2/1994 | |
| EP | 0 637 807 A2 | 2/1995 | |
| EP | JP 08069439 | 3/1996 | |
| JP | 407064923 A | * 3/1995 | |
| JP | 408077085 A | * 3/1996 | |
| JP | 11272756 A | * 10/1999 | G06F/17/60 |
| WO | WO 9848551 A2 | * 10/1998 | H04M/1/274 |
| WO | WO 99 10992 A | 3/1999 | |
| WO | WO01/52129 A1 | * 7/2001 | G06F/17/60 |

* cited by examiner

Primary Examiner—Karl D. Frech
Assistant Examiner—Uyen-Chau Le
(74) Attorney, Agent, or Firm—Finnegan, Henderson, Farabow, Garrett & Dunner, L.L.P.

(57) ABSTRACT

A communication equipment automatically interchanges business card information and displays such information on a display, thus making operation by a user for interchanging business card information unnecessary. The communication equipment includes a business card memory, a business card information display, a business card information reception function, a business card information transmission function, a communication equipment detection function, a network transmission/reception function, a storage device, a display and a mouse. When the communication equipment function detection function finds communicable equipment, the communication equipment displays a list of the communicable equipment. The user then starts communication with the desired counterpart. The business card information is automatically interchanged allowing direct input of the business card information to the equipment.

21 Claims, 4 Drawing Sheets

COMMUNICATION EQUIPMENT AND METHOD FOR BUSINESS CARD INFORMATION INTERCHANGE

FIELD OF THE INVENTION

The present invention relates to a communication equipment and method for performing a transmission/reception through a communication network.

BACKGROUND OF THE INVENTION

It is a common practice that a user registers its personal information to a communication equipment that the user uses. For example, its name, its address, its phone number, its office name, its school name, the telephone numbers of these places, its electronic mail address and so on are registered. These personal information of the user are called "business card information".

Although there is a case that the business card information is read from an actual business card by using a reader such as a scanner and the business card information is stored in the equipment, there is another case that the user directly inputs the business card information to the equipment. As an example which embodies an equipment which registers the business card information of the user, there is an equipment called "PDA (Personal Digital Assistant)". The PDA has a function of managing the personal information of the user (a schedule management, an action item management, an address book management).

Further, the PDA having a communication function is capable of exchanging the preregistered business card information with other PDA and takes in the received information into its own address book.

In this manner, the PDA which functions such that the function of managing address book is correlated with the function of interchanging the business card information with the PDA which others use and the interchanged business card information is taken in the address book has been already known.

As a second example of an equipment which is capable of registering the business card information, a portable personal computer can be named. In general, a software which manages the personal information is called PIM (Personal Information Manger) software and such a software often has a business card interchanging function and an address book management function which is correlated with the former function as in the case of the PDA.

At the time of interchanging the business cards, the user must perform an operation called "business card information transmission". That is, the business card information can be interchanged only when both user or either one of users perform the "business card information transmission". Here, the information interchanged and stored is only the business card information.

In the conventional equipment such as the PDA or the like, there has been a problem that even when the PDAs of both parties are in a communicable condition, the user must inevitably perform the operation to designate the business card information transmission.

Further, there has been another problem that in case the user wants to start any communication with the counterpart equipment after the interchange of the business cards, the only way to identify other equipment is to discriminate by the address or the name given to the equipment and hence, only by looking at the address or the name given to the equipment, it is difficult for the user to accurately select the desired counterpart without fail.

SUMMARY OF THE INVENTION

Therefore, there is a need for a communication equipment and method for automatically interchanging business card information and displaying the business card information on a display, thus making it unnecessary for a user to perform the operation for interchanging the actual business card.

In accordance with the present invention there is provided a communication equipment comprising business card information transmission means for transmitting business card information including at least a portion of a name of a user of its own communication equipment; business card information reception means for receiving business card information including at least a portion of a name of a user of other communication equipment; business card information display means for displaying the business card information of a user of the other communication equipment received by said business card information reception means; and business card information memory means for storing the business card information of a user of its own communication equipment and the business card information of other communication equipment.

Also in accordance with the present invention, there is provided a communication method comprising transmitting business card information including at least a portion of the name of a user of the user's own communication equipment; receiving business card information including at least a portion of a name of a user of other communication equipment; displaying the business card information of the other communication equipment received in a business card information display; and storing in memory the business card information of the user's own communication equipment and the business card information of the other communication equipment.

Further in accordance with the present invention, there is provided a storage medium for storing a program of a communication method, wherein said program performs transmitting business card information including at least a portion of a name of a user of the user's own communication equipment; receiving business card information including at least a portion of a name of a user of other communication equipment; displaying the received business card information of the other communication equipment; and storing the business card information of the user's own communication equipment and the business card information of the other communication equipment.

DISCLOSURE OF THE INVENTION

The invention according to claim 1 is directed to a communication equipment comprising business card information transmission means for transmitting business card information which includes at least a portion of a name of a user of its own communication equipment, without users operation for transmitting business card information reception means for receiving business card information which includes at least a portion of a name of a user of other communication equipment, business card information display means for displaying the business card information of other communication equipment received by the business card information reception means, and business card information memory means for storing the business card information of its own communication equipment and the business card information of other communication equipment.

The invention according to claim 2 is directed to a communication equipment according to claim 1, wherein the equipment includes communication equipment detection means which finds out other communication equipment which is communicable with its own communication equipment, the business card information transmission means transmits the business card information of its own communication equipment to other communication equipment detected by the communication equipment detection means, and the business card information display means picks out and displays the business card information corresponding to other communication equipment detected by the communication equipment detection means.

The invention according to claim 3 is directed to a communication equipment according to claim 1, wherein the business card information memory means stores information on a condition in which the communication equipment is connected to other communication equipment together with the business card information of other communication equipment.

The invention according to claim 4 is directed to a communication equipment according to claim 1 wherein the communication equipment includes image inputting means which photographs an image and converts the image to electronic data, and the business card information transmission means transmits the image information together with the business card information.

The invention according to claim 5 is directed to a communication equipment according to claim 1, wherein in case the business card information of its own communication equipment is not set, the business card information transmission means transmits given information set other than the business card information as the business card information of its own communication equipment.

The invention according to claim 6 is directed to a communication equipment according to claim 1, wherein in case there is no business card information of other communication equipment, the business card information display means displays given information set to its own communication equipment as the business card information of other communication equipment.

The invention according to claim 7 is directed to a communication equipment according to claim 1, wherein in case there is no business card information of its own communication equipment or there is no business card information of other communication equipment, the business card information memory means stores given information set in its own communication equipment as the business card information of these communication equipment.

The invention according to claim 8 is directed to a communication method comprising a business card information transmission step for transmitting business card information including at least a portion of the name of a user of its own communication equipment, without users operation for transmitting the business card information a business card information reception step for receiving business card information including at least a portion of the name of a user of other communication equipment, a business card information display step for displaying the business card information of other communication equipment received in the business card information reception step, and a business card information memory step for storing the business card information of its own communication equipment and the business card information of other communication equipment.

The invention claimed in claim 9 is directed to a communication method according to claim 8, wherein the method includes a communication equipment detection step which finds out other communication equipment which is communicable with its own communication equipment, the business card information transmission step transmits the business card information of its own communication equipment to other communication equipment detected by the communication equipment detection step, and the business card information display step picks out and displays only the business card information corresponding to other communication equipment detected by the communication equipment detection step.

The invention claimed in claim 10 is directed to a communication method according to claim 8, wherein the business card information memory step stores information on a condition in which its own communication equipment is connected to other communication equipment together with the business card information of other communication equipment.

The invention claimed in claim 11 is directed to a communication method according to claim 8 wherein the communication method includes image inputting step which photographs an image and converts the image to electronic data, and the business card information transmission step transmits the image information together with the business card information.

The invention claimed in claim 12 is directed to a communication method according to claim 8, wherein in case the business card information of its own communication equipment is not set, the business card information transmission step transmits given information set other than the business card information as the business card information of its own communication equipment.

The invention claimed in claim 13 is directed to a communication method according to claim 8, wherein in case there is no business card information of other communication equipment, the business card information display step displays given information set in its own communication equipment as the business card information of other communication equipment.

The invention according to claim 14 is directed to a storage medium which stores a program of a communication method for performing a business card information transmission function of transmitting business card information which includes at least a portion of the name of a user of its own communication equipment, a business card information reception function of receiving business card information which includes at least a portion of the name of a user of other communication equipment without users operation for transmitting the business card information, a business card information display function of displaying the business card information of other communication equipment received by the business card information reception function, and a business card information memory function of storing the business card information of its own communication equipment and the business card information of other communication equipment.

The invention claimed in claim 15 is directed to a storage medium according to claim 14, wherein the method includes a communication equipment detection function which finds out other communication equipment which is communicable with its own communication equipment, the business card information transmission function transmits the business card information of its own communication equipment to other communication equipment detected by the communication equipment detection means, and the business card information display function picks out and displays only the business card information corresponding to other communication equipment detected by the communication equipment detection function.

The invention claimed in claim 16 is directed to a storage medium according to claim 14, wherein the business card information memory function stores information on a condition in which its own communication equipment is connected to other communication equipment together with the business card information of other communication equipment.

The invention claimed in claim 17 is directed to a storage medium according to claim 14 wherein the storage medium includes an image inputting function which photographs an image and converts the image to electronic data, and the business card information transmission function transmits the image information together with the business card information.

The invention claimed in claim 18 is directed to a storage medium according to claim 14, wherein in case the business card information of its own communication equipment is not set, the business card information transmission function transmits given information set other than the business card information as the business card information of its own communication equipment.

The invention claimed in claim 19 is directed to a storage medium according to claim 14, wherein in case there is no business card information of other communication equipment, the business card information display function displays given information set to its own communication equipment as the business card information of other communication equipment.

In the following explanation, its own communication equipment is called as "its own equipment" and other communication equipment other than its own equipment is called as "other equipment".

The invention according to claim 1 automatically transmits the business card information and displays such information. Accordingly, it is no more necessary for the user to perform the operation for interchanging business card information.

The invention according to claim 2 displays the business card information of the user of a currently communicable equipment from the stored business card information. The user who wants to communicate with other user is capable of selecting a counterpart with whom the user wants to communicate from the displayed business card information and hence, the user can start the communication without knowing the address and the equipment name of the equipment of the counterpart with whom the user wants to communicate.

The invention according to claim 3 stores the date on which the connection is made and the like together with the business card information and interchanges the information on services (for example, a service necessary for transferring files, a electronic white board function, or a version information on prepared services) and stores them. Further, if there are any services which are actually provided, such services are also stored. Accordingly, it becomes possible to pick out only the business card information of the equipment which has services compatible with those of its own equipment and to perform the communication only with such equipment.

The invention according to claim 4 transmits not only the business card information made of characters and numerals but also image information (an image of the face of the user or the like) which is inputted on the occasion. Accordingly, the user can select the communication counterpart based on not only the characters information but also the image information displayed on the display.

The invention according to claim 5 obtains and transmits suitable values (for example, the log-in name of a computer or the like) from information set to its own equipment or transmits a given character string ("name unknown" or "unknown user" or the like) as the business card information of its own equipment, even when the business card information of its own equipment is not preset. Accordingly, even the user who has just purchased the equipment and has not yet set its business card information or the user who has forgotten to set its business card information can easily use the equipment.

The invention according to claim 6 obtains and displays suitable values (for example, values obtained from the database of equipment which the its own equipment had an access in the past) from the information set to its own equipment or displays given character strings ("name unknown" or "unknown user" or the like) as the business card information of other equipment in case empty business card information is transmitted from other equipment. Accordingly, even when the business card information is not transmitted from other equipment, the user can designate and communicate with the equipment.

The invention as according to claim 7 can obtain and store suitable values (for example, the log-in name of a computer or the like) from the information set to its own equipment or can store given character strings ("name unknown" or "unknown user" or the like) as the business card information, even when there is no business card information of its own equipment or no business card information of other equipment. Accordingly, other equipment recognized as equipment communicable with its own equipment and having no business card information or its own equipment to which the business card information is not set can be stored using the temporary business card information That is, according to the present invention, when the communicable equipment is found out, the business card information is automatically interchanged and hence, it is no more necessary to bother the hand of the user each time the communication is to be made. Further, by displaying the business card information in place of the address or the name of the communicable equipment, the user can easily start communication with a desired counterpart. Further, by offering not only the character information but also the image information, the selection of the communication counterpart becomes further easier. For example, by transmitting the image of the face of the user or the like, the communication can be started by clicking the desired counterpart from the face image icons displayed on the display of its own equipment.

BEST MODES FOR CARRYING OUT THE INVENTION

The modes for carrying out the present invention is explained hereinafter.

First Embodiment

Figure 1:
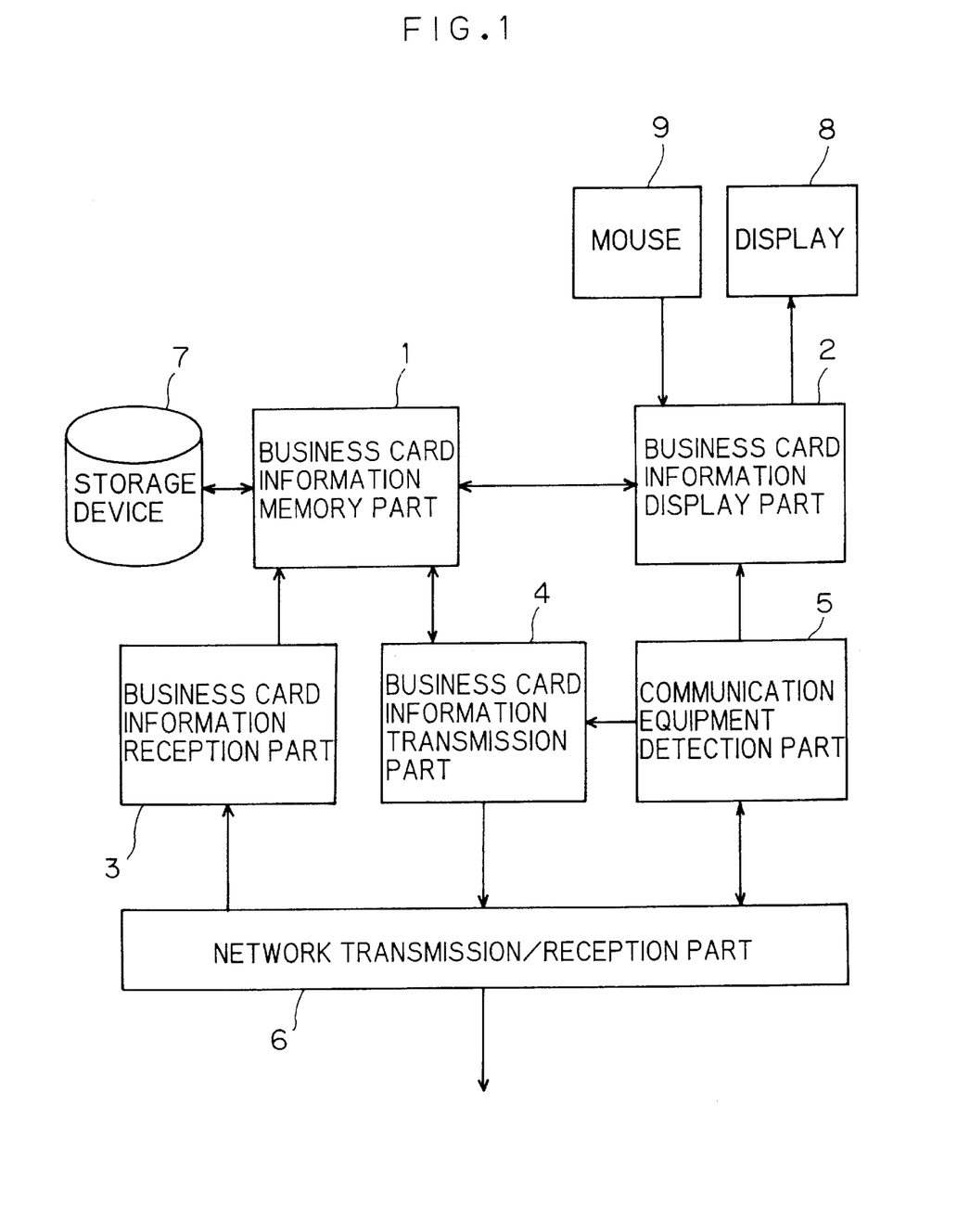
FIG. 1 is a view showing an example of the structure of communication equipment according to the first embodiment of the present invention.
Figure 2:
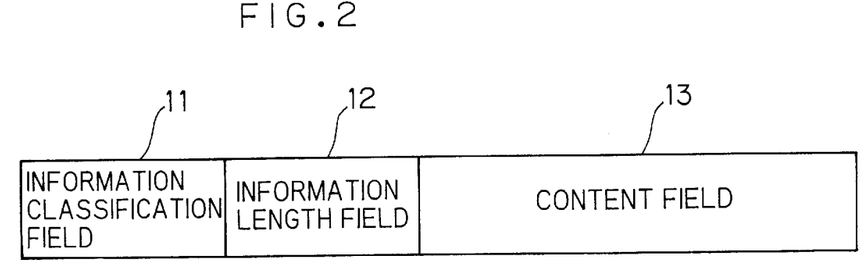
FIG. 2 is a view showing a data format at the time of transmission/reception according to this embodiment.
Figure 3:
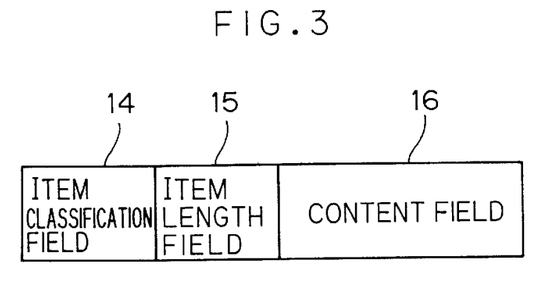
FIG. 3 is a view showing a format of each item at the time of transmission/reception of the business card information according to this embodiment.

A communication equipment according to the first embodiment of the present invention is explained in conjunction with FIG. 1 to FIG. 3.

1. Constitution

FIG. 1 shows an example of the structure of the communication equipment according to the first embodiment.

As shown in FIG. 1, the communication equipment is comprised of a business card information memory part 1, a business card information display part 2, a business card information reception part 3, a business card information transmission part 4, a communication equipment detection part 5, a network transmission/reception part 6, a storage device 7, a display 8 and a mouse 9.

The business card information memory part 1 stores business card information of its own communication equipment (hereinafter called "its own equipment") and other communication equipment (hereinafter called "other equipment") in a storage device such as a hard disc, a flash memory or the like. To make the information available to other applications such as a mailer, a scheduler or the like, the business card information is stored in a form that they are taken in their address books used in these applications.

The business card information display part 2 displays the business card information of its own equipment and other equipment on a display. The business card information display part 2 executes a control such that the family name and the given name are picked out from the business card information and they are displayed in a form of a table. Upon receiving the instruction from the user, the business card information display part 2 displays detailed information such as the place of work, the assignment, the managerial position, the telephone number or the like.

The business card information reception part 3 receives the business card information transmitted from other equipment through the network transmission/reception part 6 and picks out the business card information from the received data.

The business card transmission part 4 establishes a communication connection with other equipment through the network transmission/reception part 6 and transmits the business card information to other equipment through this connection. The business card information to be transmitted is converted to a data array in accordance with a prescribed format and is transmitted. Upon completion of transmission, the communication connection is disconnected.

The communication equipment detection part 5 holds a list of equipment capable of communicating with its own equipment and updates the list every fixed time. To be more specific, the communication equipment detection part 5 transmits a beacon packet which stores the address of its own equipment and the address of the communicable equipment periodically and receives a beacon packet transmitted from other equipment and updates the content of the list of the communicable equipment.

The network transmission/reception part 6 establishes a communication connection with a network transmission/reception part 6 of other equipment and assures the reliability of the transmission/reception data for this connection. Electromagnetic wave is used as a transmission medium. Other system such as an optical communication may be used for executing the similar processing.

The storage device 7 is a storage medium which stores the electronic information and is made of a magnetic disc, a flash memory or the like.

The display 8 is a display device such as a Braun tube or a liquid crystal display for displaying image signals. The user can watch the image displayed on the display 8.

The mouse 9 is an inputting device employed by the user for moving a mouse cursor displayed in a two dimensional space displayed on the display 8. The user can send instructions to the communication equipment by means of the mouse.

Although the business card information memory part 1, the business card information display part 2, the business card information reception part 3, the business card information transmission part 4, the communication equipment detection part 5 and the network transmission/reception part 6 are expressed in a form of devices, they may be realized by preparing a program which realizes the functions of these devices and the program is stored in a communicable personal computer or the like. In this case, this program may be stored in a FD, a CD-ROM or a MO or may be stored or installed in a hard disc. This is not limited to the present embodiment and the same goes for the second embodiment to the fifth embodiment which will be explained hereinafter.

2. Manner of Operation

The manner of operation is explained in view of a specific example:

(1) The communication equipment detection part 5 always monitors whether there is any equipment which is communicable with its own equipment and holds the list of the communicable equipment. Once the communication equipment detection part 5 finds out the communicable equipment, the part 5 informs the business card information transmission part 4 and the business card information display part 2 of the address of the communicable equipment.

(2) Upon reception of the information from the communication equipment detection part 5 that the communicable equipment exists, the business card information transmission part 4 instructs the network transmission/reception part 6 to establish the communication connection with the equipment.

(3) The network transmission/reception part 6 establishes the connection with the counterpart equipment. It is assured that the data transmitted through this connection accurately reaches the counterpart.

(4) Once the connection is established, the business card information transmission part 4, transmits the business card information. An example of the format of the information at the point of time of transmission is shown if FIG. 2.

The communication equipment displays the business card information of the user of a currently communicable equipment from the stored business card information. The user who wants to communicate with other user is capable of selecting a counterpart with whom the user wants to communicate from the displayed business card information and hence, the user can start the communication without knowing the address and the equipment name of the equipment of the counterpart with whom the user wants to communicate.

The communication equipment stores the date on which the connection is made and the like together with the business card information and interchanges the information on service (for example, a service necessary for transferring files, a electronic white board function, or a version information on prepared services) and stores them. Further, if there are any services which are actually provided, such services are also stored. Accordingly, it becomes possible to pick out only the business card information of the equipment which has services compatible with those of its own equipment and to perform the communication only with such equipment.

The communication equipment transmits not only the business card information made of characters and numerals but also image information (an image of the face of the user or the like) which is inputted occasionally. Accordingly, the user can select the communication counterpart based on not only the characters information but also the image information displayed on the display.

The communication equipment obtains and transmits suitable values (for example, the log-in name of a computer or the like) from information set to its own equipment or transmits a given character string) "name unknown" or "unknown user" or the like) as the business card information of its own equipment, even when the business card information of its own equipment is not preset. Accordingly, even the user who has just purchased the equipment has not yet set its business card information or the user who has forgotten to set its business card information can easily use the equipment.

Furthermore, suitable values (for example, values obtained from the database or equipment which a user of its own equipment had an access in the past) from the information set to a user of its own equipment or displays given character strings ("name unknown" or "unknown user" or the like) as the business card information of other equipment in case empty business card information is transmitted from other equipment. Accordingly, even when the business card information is not transmitted from other equipment, the user can designate and communicate with the equipment.

The communication equipment can obtain and store suitable values (for example, the log-in name of a computer or the like) from the information set to its own equipment or can store given character strings ("name unknown" or "unknown use" or the like) as the business card information, even when there is no business card information of its own equipment or no business card information of other equipment. Accordingly, other equipment recognized as equipment communicable with a user of its own equipment and having no business card information card or a user of its own equipment to which the business card information is not set can be stored using the temporary business card information.

When the communicable equipment is detected, the business card information is automatically interchanged and hence, it is not necessary to bother the hand of the user each time the communication is to be made. Further, by displaying the business card information in place of the address or the name of the communicable equipment, the user can easily start communication with a desired counterpart. Further, by offering not only the character information, but also the image information, the selection of the communication counterpart becomes easier. For example, by transmitting the image of the face of the user or the like, the communication can be start by clicking the desired counterpart from the face image icons displayed on the display of its own equipment.

The communication equipment has an information classification field 11 that stores values indicative of contents of information. In case this value is "1", this information indicates the business card information.

An information length field 12 stores values which indicate the length of data stored in a content field 13 by a byte unit.

The content field 13 stores the content of the information. In case the information is the business card information, the content field 13 stores, the name information, the assignment information, the address information and the like in a form that they are classified into items.

Respective items are stored in accordance with the format shown in FIG. 3.

An item classification field 14 shows values indicative of the kinds of items, wherein following values are used.

In case of storing the address of equipment, the value is "1".

In case of storing the name of the user, the value is "2".

In case of storing the family name of the user, the value is "3".

In case of storing the assignment information of the user such as the place :of work, the value is "4".

In case of storing the address of the place of work, the value is "5".

In case of storing the telephone number of the place of work, the value is "6".

In case of storing the facsimile number of the place of work, the value is "7".

In case of storing the electronic mail address used at the place of work, the value is "8".

In case of storing the managerial position of the user such as the title, the value is "9".

In case of storing the address of the own home of the user, the value is "10".

In case of storing the telephone number of the own home of the user, the value is "11".

In case of storing the facsimile number of the own home of the user, the value is "12".

In case of storing the address of the electronic mail at home, the value is "13".

The item length field 15 stores values which indicate the lengths of data to be stored in a content field 16 by a byte unit.

The content field 16 stores the content of the information corresponding to respective items.

For example, the character information indicative of the place of work is stored in the item of the place of work of the user.

(5) The business card information transmission part 4 demands the business card information memory part 1 of the business card information of its own equipment.

(6) The business card information memory part 1 reads the business card information of its own equipment from the storage device 7.

(7) The business card information transmission part 4 which obtained the business card information of its own equipment from the business card information memory part 1 prepares data whose values are stored in respective fields in accordance with the previously mentioned format and rules and demands the network transmission/reception part 6 of the transmission of the data.

(8) The network transmission/reception part 6 transmits the data of the business card information received from the business card information transmission part 4.

(9) The network transmission/reception part 6 of the counterpart equipment receives the data and reads the values of the information classification field 11 of the data and if it is judged that the value is indicative of the business card information, the information is transmitted to the business card information reception part 3.

(10) The business card information reception part 3 interprets the information in accordance with the previously mentioned format and rules and picks out the business card information of other equipment such as the address, the family name and given name or the assignment of the user and the like, and then instructs the business card information memory part 1 to store them as the business card information of other equipment.

(11) The business card information memory part 1 makes the storage device 7 store such information. The information is stored in a form of an address book which is adopted in the mailer or the like.

(12) Upon receiving the address information of the communicable equipment from the communication equipment detection part 5, the business card information display part 2 demands the business card information memory part 1 of the business card information of other equipment having such an address.

(13) The business card information memory part 1 retrieves the business card information corresponding to such an address and if the business card information exists, the business card information memory part 1 transmits the information to the business card information display part 2. If there is no such information, the business card information memory part 1 informs the business card information display part 2 of this fact accordingly.

(14) Upon receiving the business card information from the business card information memory part 1, the business card information display part 2 displays such information on the display 8. If other business card information is already displayed, the information is displayed in addition to other business card information. If the business card information display part 2 receives information from the business card information memory part 1 that there is no business card information which corresponds to the address, the business card information display part 2 again demands the business card information memory part 1 of the business card information corresponding to the address after a lapse of a given time.

The business card information display part 2 selects and displays suitable items from the business card information in view of the displayable size, the number of business card information to be displayed and the like.

For example, in case the displayable size is small and hence, all items of all business card information cannot be displayed, the items to be displayed is restricted only to the family name and the given name.

In case all business card information cannot be displayed even when the number of items are restricted, a scroll bar is added. With respect to items other than the family name and the given name of respective business card information, when the family name and the given name are clicked twice with the mouse, a new dialogue appears and other items are displayed.

Second Embodiment

Figure 4:
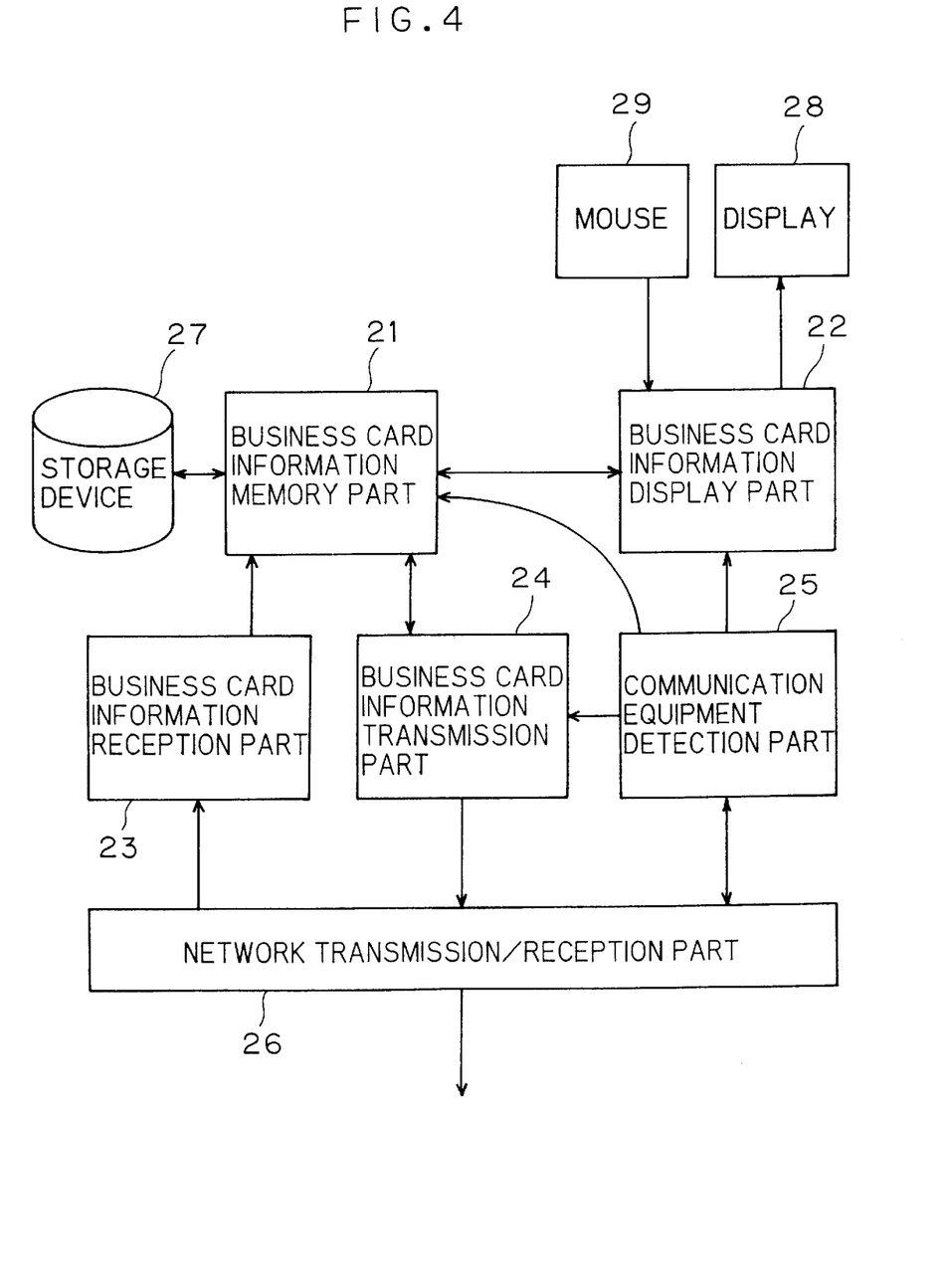
FIG. 4 is a view showing an example of the structure of communication equipment according to the second embodiment of the present invention.

The second embodiment is explained hereinafter. An example of the structure is shown in FIG. 4.

Although the manner of operation of respective parts is substantially as same as the first embodiment, the manner of operation of a business card information memory part 21, a business card information display part 22 and a communication equipment detection part 25 is different. The reference numerals of devices which correspond to those of the first embodiment are denoted by adding 20 to the reference numerals of the devices of the first embodiment.

The business card information memory part 21 stores business card information of its own equipment and other equipment in a storage device such as a hard disc, a flash memory or the like. To make the information available to other applications such as a mailer, a scheduler or the like, the business card information is stored in a form that they are taken in their address books used in these applications. Further, the business card information memory part 21 stores information on whether its own equipment is currently communicable with other equipment or not in addition to these business card information.

The business card information display part 22 displays the business card information of its own equipment and other equipment on a display. The business card information display part 22 executes a control such that the family name and the given name are picked out from the business card information and they are displayed in a form of a table. Upon receiving the instruction from the user, the business card information display part 22 displays detailed information such as the place of work, the assignment, the managerial position, the telephone number or the like. Further, upon receiving the instruction from the user, the business card information display part 22 changes the display of the business card information which are to be displayed to the display of only the business card information corresponding to the equipment which is currently communicable.

The communication equipment detection part 25 holds a list of equipment, capable of communicating with its own equipment and updates the list every fixed time.

To be more specific, the communication equipment detection part 25 transmits a beacon packet which stores the address of its own equipment and the address of the communicable equipment periodically and receives a beacon packet transmitted from other equipment and updates the content of the list of the communicable equipment.

As a result, in case the equipment which is once communicable becomes incommunicable, the communication equipment detection part 25 informs the business card information memory part 21 of the address of the equipment.

Upon receiving a demand that the business card information to be displayed should be restricted only to the information of the currently communicable equipment, the business card information display part 22 demands the business card information memory part 21 of the business card information of the currently communicable equipment. Upon receiving such a demand, the business card information memory part 21 retrieves the currently communicable equipment from the address book or the like and transmits the business card information corresponding to respective equipment obtained as a result of the retrieval to the business card information display part 22. The business card information display part 22 displays these business card information on the display.

Third Embodiment

The third embodiment is explained hereinafter.

Although the manner of operation of respective parts is substantially as same as the first embodiment, the manner of operation of a business card information memory part 1 is different. The structural view is as same as that of FIG. 1.

The business card information memory part 1 stores business card information of its own equipment and other equipment in a storage device such as a hard disc, a flash memory or the like. To make the information available to other applications such as a mailer, a scheduler or the like, the business card information is stored in a form that they are taken in their address book used in these applications.

Further, the business card information memory part 1 stores ancillary information such as the latest date on which the communication between the respective equipment and its own equipment becomes possible or the latest date on which the connection becomes possible, the services available on the date, the total number of connections, services which can be offered by the equipment and the like.

Fourth Embodiment

Figure 5:
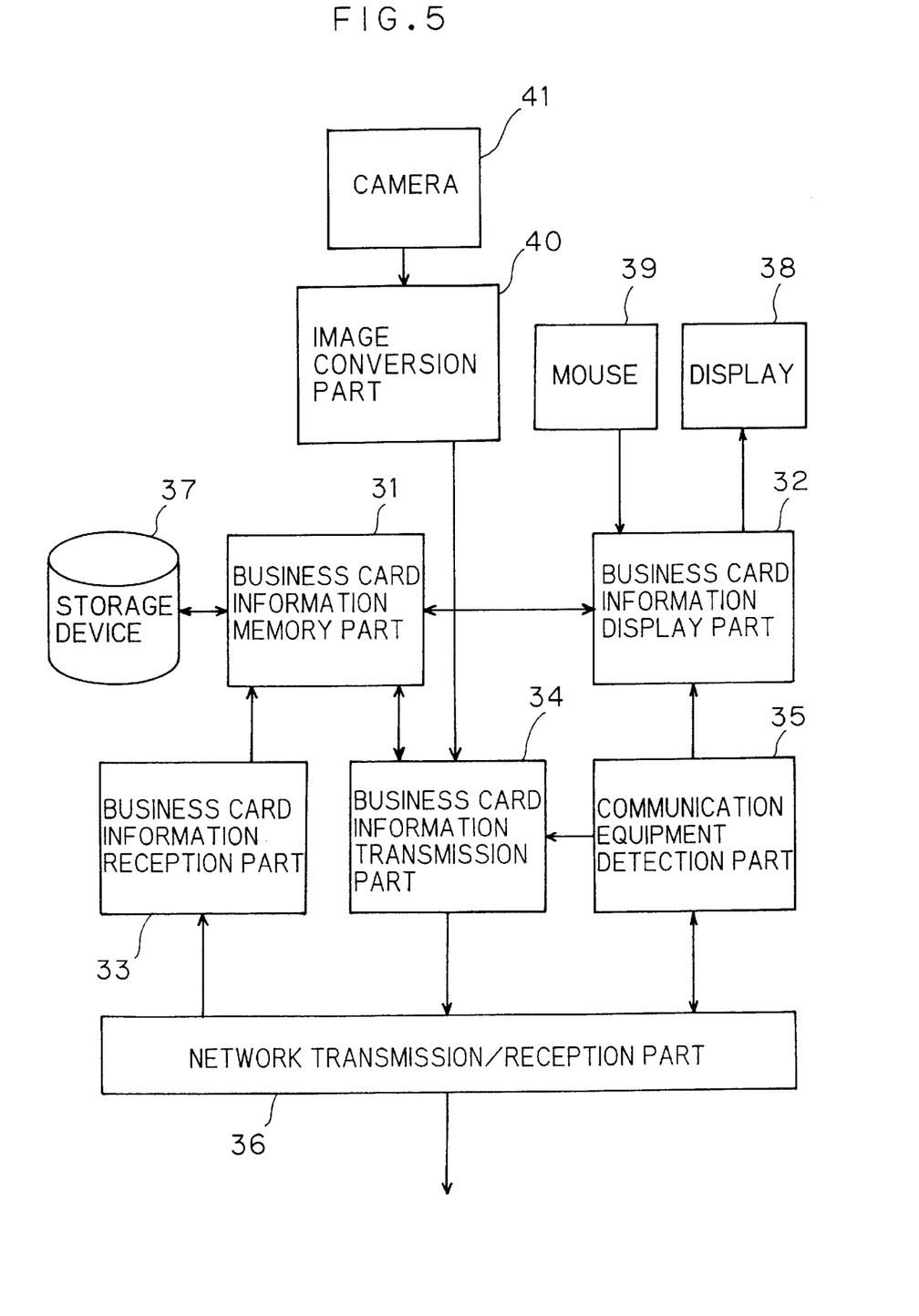
FIG. 5 is a view showing an example of the structure of communication equipment according to the fourth embodiment of the present invention.

The fourth embodiment is explained hereinafter. An example of the structure is shown in FIG. 5.

Although the manner of operation of respective parts is substantially as same as the first embodiment, an image conversion part 40 and a camera 41 are added. Further, the manner of operation of a business card information transmission part 34, a business card information reception part 33 and a business card information display part 32 is different. The reference numerals of devices which correspond to those of the first embodiment are denoted by adding 30 to the reference numerals of the devices of the first embodiment.

The image conversion part 40 converts image signals received from the camera 41 into electronic information suitable for processing by a computer. The image conversion part 40 can convert the image signals to the de facto standard such as JPEG, GIF, BMF or the like.

The camera 41 converts optically obtained images into electric image signals.

The business card transmission part 34 establishes a communication connection with other equipment through the network transmission/reception part 6 and transmits the business card information to other equipment through this connection. The business card information to be transmitted is converted to a data array in accordance with a prescribed format and is transmitted. Further, the business card information transmission part 34 transmits the image information obtained from the image conversion part 40 together with the business card information. If necessary, the image information is first compressed and then is transmitted. The format at the time of transmission follows those shown in FIG. 2 and FIG. 3. In case of transmitting the image information, the value of the information classification field is set to 1 (business card information) and the value of the item classification field is set to 100. Upon completion of transmission, the communication connection is disconnected.

The business card information reception part 33 receives the data of the business card information transmitted from other equipment through the network transmission/reception part 6 and picks out the business card information from the received data. Further, in case the received image information is compressed, the business card information reception part 33 expands the information and demands the business card information memory part 31 to store the information.

The business card information display part 32 displays the business card information of its own equipment and other equipment on a display. The business card information display part 32 executes a control such that the image, the family name and the given name are picked out from the business card information and they are displayed in a form of a table. Upon receiving the instruction from the user, the business card information display part 32 displays detailed information such as the place of work, the assignment, the managerial position, the telephone number and the like.

Further, depending on the displayable size, the business card information display part 32 displays the image after suitably thinning out the image. When the user carries the mouse cursor onto the image and clicks twice, a dialogue which displays the detailed information such as the place of work and the assignment appears.

Fifth Embodiment

The fifth embodiment is explained hereinafter.

Although the manner of operation of respective parts is substantially as same as the first embodiment, the manner of operation of the business card information memory part 1, the business card information display part 2 and the business card information transmission part 4 is different. The structural view is as same as that of FIG. 1.

The business card information memory part 1 stores business card information of its own equipment and other equipment in a storage device such as a hard disc, a flash memory or the like. To make the information available to other applications such as a mailer, a scheduler or the like, the business card information is stored in a form that they are taken in their address book used in these applications. In case the business card information of its own equipment is not set, the business card information memory part 1 retrieves a suitable value (for example, a log-in name of a computer or the like) from values set in its own equipment. If the suitable value exists, this value is stored as the business card information of its own equipment. If no suitable value exists, the business card information memory part 1 stores given character strings (for example, "name unknown" or "unknown user") as the business card information of its own equipment. When the user sets the business card information, these business card information are automatically substituted. Further in case the business card information of other equipment cannot be obtained due to reasons such that an empty business card information is transmitted from other equipment and the like, the business card information memory part 1 obtains suitable values (for example, values obtained from the data base of the equipment connected in the past) from the information set by its own equipment, or alternatively, the business card information memory part 1 stores given character strings ("name unknown", "unknown user" or the like) as the business card information. These business card information are substituted at a point of time that the business card information is transmitted from other equipment.

The business card information display part 2 displays the business card information of its own equipment and other equipment on a display. The business card information display part 2 executes a control such that the family name and the given name are picked out from the business card information and they are displayed in a form of a table. Upon receiving the instruction from the user, the business card information display part 2 displays detailed information such as the place of work, the assignment, the managerial position, the telephone number or the like. Further in case the business card information of other equipment cannot be obtained due to reasons such that an empty business card information is transmitted from other equipment and the like, the business card information display part 2 obtains suitable values (for example, values obtained from the data base of the equipment connected in the past) from the information set by its own equipment, or alternatively, displays given character strings ("name unknown", "unknown user" or the like) on the display as the business card information.

The business card information transmission part 4 establishes a communication connection with other equipment through the network transmission/reception part 6 and transmits the business card information to other equipment through this connection. The business card information to be transmitted is converted to a data array in accordance with a prescribed format and is transmitted. Upon completion of transmission, the communication connection is disconnected. Further, even if the business card information of its own equipment is not preset, the business card information transmission part 4 obtains suitable values (for example, log-in name of a computer or the like) from the information set in its own equipment and prepares and transmits the data array by using such values as the item "family name" of the business card information or alternatively, transmits given character strings ("name unknown", "unknown user" or the like) as the item "family name" of the business card information of its own equipment.

Industrial Applicability

According to the present invention, the user can automatically collect the business card information of other equipment without operating the communication equipment at the time of interchanging the business card information.

Further, these information are used for displaying the list of the communicable equipment and hence, the user can start the communication more easily than the case that the address or the name of the equipment is offered.

By only storing the information of the last connection, with the use of such stored information, the same connection condition can be automatically obtained when the equipment becomes communicable next time. For example, by making use of the history information of the past connections, a list of equipment which executed the file transfer in the past can be obtained or a system which assures the setting of an automatic file transfer at the time of next connection can be implemented.

In case the image information is used in addition to the character information as the business card information, the user can have easier access to the communication equipment so that the availability and the operability of the communication equipment are enhanced.

Further, even if the business card information is not set in the equipment, when the equipment is in a communicable condition for the time being, it is extremely convenient for the user. By displaying the counterpart with the preliminarily incorporated temporary information or by transmitting the log-in name as the business card information of its own equipment in case of a personal computer, they are capable of functioning as the communication equipment even if the business card information is not always set.

What is claimed is:

1. A communication equipment comprising:
    business card information transmission means for transmitting business card information including at least a portion of a name of a user of its own communication equipment;
    business card information reception means for receiving business card information including at least a portion of a name of a user of other communication equipment;
    business card information display means for displaying the business card information of a user of the other communication equipment received by said business card information reception means; and
    business card information memory means for storing the business card information of a user of its own communication equipment and the business card information of the other communication equipment; wherein the communication equipment automatically collects business card information of other communication equipment without the user's operation during transmitting and receiving business card information.

2. A communication equipment according to claim 1, wherein the equipment includes communication equipment detection means which finds out other communication equipment which is communicable with its own communication equipment; wherein
    said business card information transmission means transmits the business card information of its own communication equipment to the other communication equipment detected by said communication equipment detection means; and
    said business card information display means picks out and displays the business card information corresponding to the other communication equipment detected by said communication equipment detection means.

3. A communication equipment according to claim 1, wherein said business card information memory means stores information upon a condition in which its own communication equipment is connected to the other communication equipment together with the business card information of the other communication equipment.

4. A communication equipment according to claim 1, wherein the communication equipment includes image inputting means for photographing an image and converting the image to electronic data; and
    said business card information transmission means transmits the image electronic data together with the business card information.

5. A communication equipment according to claim 1, wherein in case the business card information of its own communication equipment is not set, said business card information transmission means transmits a given information set other than the business card information as the business card information of its own communication equipment.

6. A communication equipment according to claim 1, wherein in case there is no business card information of the other communication equipment, said business card information display means displays a given information of its own communication equipment as the business card information of the other communication equipment.

7. A communication equipment according to claim 1, wherein in case there is no business card information of its own communication equipment or there is no business card information of other communication equipment, said business card information memory means stores a given information set in its own communication equipment as the business card information of its own and other communication equipment.

8. A communication equipment according to claim 1, wherein said business card information transmission means is a radio transmission means while said business card information reception means is a radio reception means.

9. A communication method comprising:
    transmitting business card information including at least a portion of the name of a user of the user's own communication equipment;
    receiving business card information including at least a portion of a name of a user of other communication equipment;
    displaying the business card information of the other communication equipment received in a business card information display; and
    storing in memory the business card information of the user's own communication equipment and the business card information of the other communication equipment; wherein the communication equipment automatically collects business card information of other communication equipment without the user's operation during transmitting and receiving business card information.

10. A communication method according to claim 9, wherein the method includes detecting other communication equipment which is communicable with the user's own communication equipment;

transmitting the business card information of the user's own communication equipment to the other communication equipment detected by said communication equipment; and displaying only the business card information corresponding to the other communication equipment detected by said communication equipment.

11. A communication method according to claim 9, wherein said business card information memory stores information based upon a condition in which the user's own communication equipment is connected to the other communication equipment together with the business card information of the other communication equipment.

12. A communication method according to claim 9, wherein the communication method includes photographing an image and converting the image to electronic data; and transmitting the image electronic data together with the business card information.

13. A communication method according to claim 9, wherein in case the business card information of the user's own communication equipment is not set, said business card information transmits a given information set other than the business card information as the business card information of the user's own communication equipment.

14. A communication method according to claim 9, wherein in case there is no business card information of the other communication equipment, said business card information displays a given information set to the user's own communication equipment as the business card information of the other communication equipment.

15. A storage medium for storing a program of a communication method, wherein said program performs:

transmitting business card information including at least a portion of a name of a user of the user's own communication equipment;

receiving business card information including at least a portion of a name of a user of other communication equipment;

displaying the received business card information of the other communication equipment; and storing the business card information of the user's own communication equipment and the business card information of the other communication equipment;

wherein the communication equipment automatically collects business card information of other communication equipment without the user's operation during transmitting and receiving business card information.

16. A storage medium according to claim 15, wherein said program further performs:

detecting other communication equipment which is communicable with the user's own communication equipment;

transmitting the business card information of the user's own communication equipment to the other communication equipment detected; and displaying only the business card information corresponding to the other communication equipment detected by said communication equipment.

17. A storage medium according to claim 15, wherein said business card information memory stores information based upon a condition in which the user's own communication equipment is connected to other communication equipment together with the business card information of the other communication equipment.

18. A storage medium according to claim 15, wherein the storage medium program further performs photographing an image and converting the image to electronic data, and transmitting the image electronic data together with the business card information.

19. A storage medium according to claim 15, wherein the storage medium program further performs transmitting a given information set other than the business card information as the business card information of the user's own communication equipment, in case the business card information of the user's own communication equipment is not set.

20. A storage medium according to claim 15, wherein the storage medium program further performs displaying a given information of the user's own communication equipment as the business card information of the other communication equipment, in case there is no business card information of the other communication equipment.

21. A communication equipment comprising:

business card information transmission device for transmitting business card information including at least a portion of a name of a user of its own communication equipment;

business card information reception device for receiving business card information including at least a portion of a name of a user of other communication equipment;

business card information display device for displaying the business card information of a user of the other communication equipment received by said business card information reception device; and business card information memory device for storing the business card information of a user of its own communication equipment and the business card information of the other communication equipment; wherein the communication equipment automatically collects business card information of other communication equipment without the-user's operation during transmitting and receiving business card information.

\* \* \* \* \*